US007828686B2

(12) United States Patent
Aiyakkannu

(10) Patent No.: US 7,828,686 B2
(45) Date of Patent: Nov. 9, 2010

(54) YAW ASSEMBLY FOR A ROTATABLE SYSTEM AND METHOD OF ASSEMBLING THE SAME

(75) Inventor: Nirmal Kumar Aiyakkannu, Karnataka (IN)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 12/407,366

(22) Filed: Mar. 19, 2009

(65) Prior Publication Data
US 2010/0144483 A1    Jun. 10, 2010

(51) Int. Cl.
F16H 48/06    (2006.01)
(52) U.S. Cl. ...................................... 475/221
(58) Field of Classification Search .................. 475/15, 475/221, 248, 332; 74/825
See application file for complete search history.

(56) References Cited
U.S. PATENT DOCUMENTS

| 25,497 | A | * | 9/1859 | Faught | 475/332 |
| 1,778,794 | A | * | 10/1930 | Constantin | 416/10 |
| 1,868,047 | A | * | 7/1932 | Constantin | 416/10 |
| 2,043,661 | A | * | 6/1936 | Howe | 475/159 |
| 4,408,954 | A | | 10/1983 | Earle | |
| 4,497,220 | A | | 2/1985 | Grinde | |
| 4,692,094 | A | | 9/1987 | Kulinyak | |
| 4,730,788 | A | * | 3/1988 | Metcalf et al. | 244/50 |
| 4,966,525 | A | | 10/1990 | Nielsen | |
| 5,088,969 | A | * | 2/1992 | Arndt | 475/201 |
| 5,238,461 | A | * | 8/1993 | Gotman | 475/248 |
| 6,176,675 | B1 | | 1/2001 | Engstrom | |
| 6,607,464 | B1 | * | 8/2003 | Bauer et al. | 475/269 |
| 7,211,018 | B2 | | 5/2007 | Kimura et al. | |
| 7,303,497 | B1 | | 12/2007 | Wige | |
| 2008/0207388 | A1 | | 8/2008 | Hicks | |

FOREIGN PATENT DOCUMENTS

JP    04297333 A  * 10/1992

* cited by examiner

Primary Examiner—Dirk Wright
(74) Attorney, Agent, or Firm—James McGinness, Esq.; Armstrong Teasdale LLP

(57) ABSTRACT

A yaw drive assembly for a rotatable system includes an input shaft configured to receive a torque from a yaw drive motor coupled within a body of the rotatable system, wherein the torque facilitates rotating the rotatable system about a yaw axis. The yaw drive assembly includes at least two output shafts configured to receive the torque and transmit a rotational yaw force to the rotatable system, and a differential gear stage operatively coupled to the two output shafts, wherein the differential gear stage includes a differential planetary gear configured to drive a pinion coupled to each of the two output shafts.

20 Claims, 7 Drawing Sheets

YAW ASSEMBLY FOR A ROTATABLE SYSTEM AND METHOD OF ASSEMBLING THE SAME

BACKGROUND OF THE INVENTION

The field of the disclosure relates generally to wind turbine generators and, more particularly, to control devices for use on wind turbine generators.

At least some known wind turbine generators include a rotor having multiple blades. The rotor is sometimes coupled to a housing, or nacelle, that is positioned on top of a base, for example, a truss or tubular tower. At least some known utility grade wind turbines (i.e., wind turbines designed to provide electrical power to a utility grid) have rotor blades having predetermined shapes and dimensions. The rotor blades transform mechanical wind energy into induced blade lift forces that further induce a mechanical rotational torque that drives one or more generators, subsequently generating electric power. The generators are sometimes, but not always, rotationally coupled to the rotor through a gearbox. The gearbox steps up the inherently low rotational speed of the turbine rotor for the generator to efficiently convert the rotational mechanical energy to electrical energy, which is fed into the electric utility grid. Gearless direct drive wind turbine generators also exist.

During operation of such known wind turbines, a yawing device may be used to orient the wind turbine into the direction of the wind. Some known yawing devices include an electrical or hydraulic motor and a high-ratio gear that acts on the toothed path of the yaw bearing and thus turns the machinery into the desired position. Due to the influence of wind shear, for example, the machinery is subjected to pulsating forces, both when yawing and when the machinery is stationary. These forces often have a dominating tendency in one direction, which means that they tend to turn the wind turbine out of the direction of the wind.

Known yawing devices include a single input shaft that receives a torque from a motor located within the wind turbine, and translates this torque via a plurality of gearing assemblies to a single output torque shaft that facilitates yawing the wind turbine. However, because of the limited rotational force that can be applied by a single output shaft, numerous yawing devices are required within each wind turbine to supply the force needed to yaw the wind turbine, especially under less-than-optimal weather conditions, i.e. in high winds.

BRIEF DESCRIPTION OF THE INVENTION

In one aspect, a yaw drive assembly for a rotatable system is provided. The yaw drive assembly includes an input shaft configured to receive a torque from a yaw drive motor coupled within a body of the rotatable system, wherein the torque facilitates rotating the rotatable system about a yaw axis. The yaw drive assembly includes at least two output shafts configured to receive the torque and transmit a rotational yaw force to the rotatable system, and a differential gear stage operatively coupled to the two output shafts, wherein the differential gear stage includes a differential planetary gear configured to drive a pinion coupled to each of the two output shafts.

In another aspect, a wind turbine is provided. The wind turbine includes a yaw drive motor, and at least one yaw drive assembly operatively coupled to the motor. The yaw drive assembly includes an input shaft configured to receive a torque from a yaw drive motor coupled within a body of the rotatable system, wherein the torque facilitates rotating the rotatable system about a yaw axis. The yaw drive assembly includes at least two output shafts configured to receive the torque and transmit a rotational yaw force to the rotatable system, and a differential gear stage operatively coupled to the two output shafts, wherein the differential gear stage includes a differential planetary gear configured to drive a pinion coupled to each of the two output shafts.

In yet another aspect, a method for assembling a rotatable system is provided. The method includes coupling a yaw drive assembly to a yaw drive motor via a yaw drive assembly input shaft, wherein the input shaft is configured to receive a torque from the yaw drive motor coupled within a body of the rotatable system, and wherein the torque facilitates rotating the rotatable system about a yaw axis. The method includes extending at least two output shafts from the yaw drive assembly, wherein the two output shafts are configured to transmit a rotational yaw force to the rotatable system. The method includes operatively coupling a differential gear stage to the two output shafts, wherein the differential gear stage includes a differential planetary gear that is configured to drive a pinion coupled to each of the two output shafts.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Figure 1:
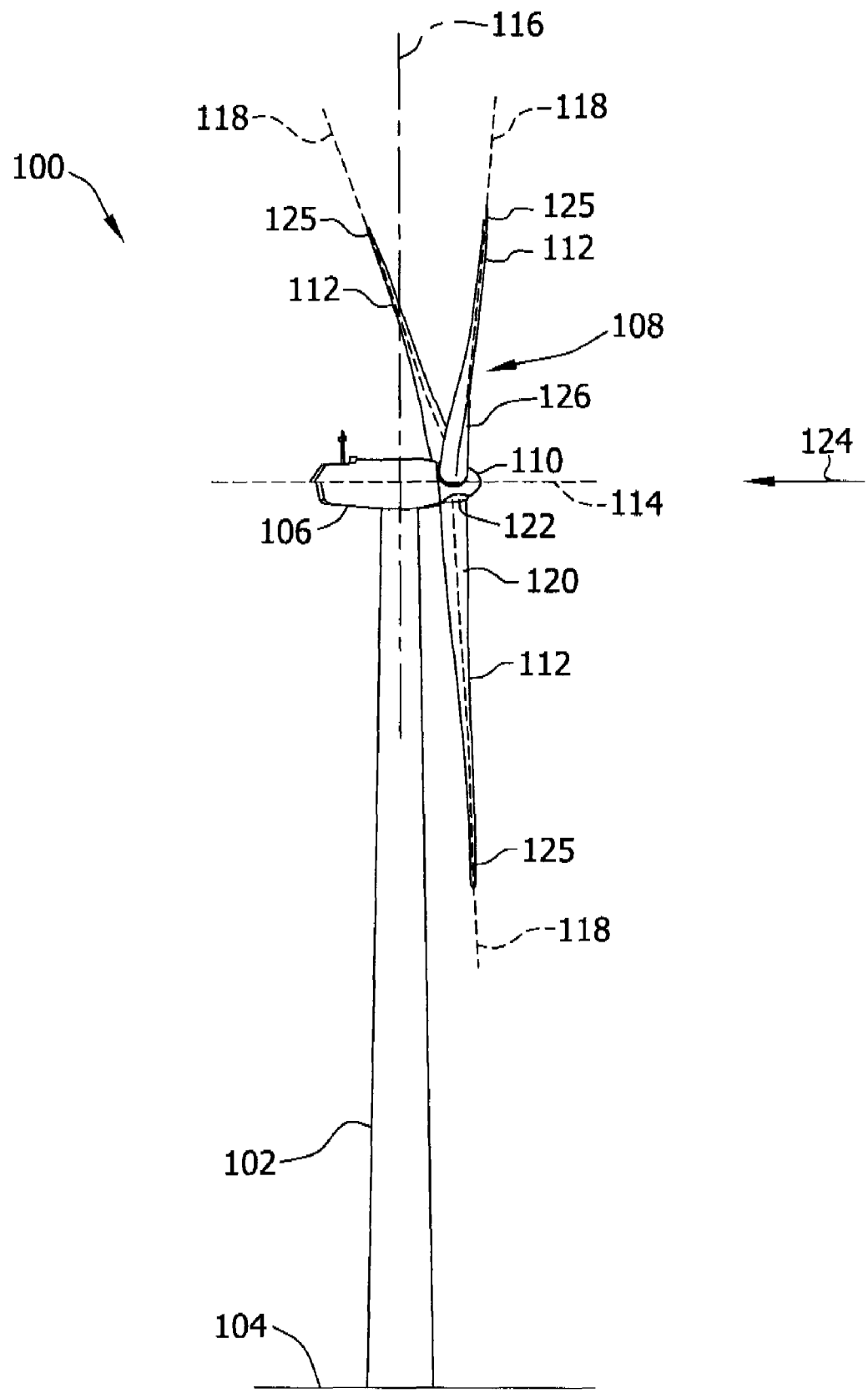
FIG. 1 is a side elevation view of an exemplary wind turbine generator.

FIG. 1 is a schematic view of an exemplary wind turbine generator 100. In the exemplary embodiment, wind turbine generator 100 is a horizontal axis wind turbine. Alternatively, wind turbine generator 100 may be a vertical axis wind turbine. Wind turbine generator 100 has a tower 102 extending from a supporting surface 104, a nacelle 106 coupled to tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enables wind turbine generator 100 to function as described herein. In the exemplary embodiment, tower 102 is fabricated from tubular steel and has a cavity (not shown in FIG. 1) extending between supporting surface 104 and nacelle 106. Alternatively, tower 102 is any tower that enables wind turbine generator 100 to function as described herein including, but not limited to, a lattice tower. The height of tower 102 is any value that enables wind turbine generator 100 to function as described herein.

Blades 112 are positioned about rotor hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control the perspective of blades 112 with respect to the direction of wind 124. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122. Each blade 112 also includes a blade tip portion 125.

In the exemplary embodiment, blades 112 have a length between 50 meters (m) (164 feet (ft)) and 100 m (328 ft), however these parameters form no limitations to the instant disclosure. Alternatively, blades 112 may have any length that enables wind turbine generator to function as described herein. As wind 124 strikes each blade 112, blade lift forces (not shown) are induced on each blade 112 and rotation of rotor 108 about rotation axis 114 is induced as blade tip portions 125 are accelerated. A pitch angle (not shown) of blades 112, i.e., an angle that determines a perspective of each blade 112 with respect to the direction of wind 124, may be changed by a pitch adjustment mechanism (not shown in FIG. 1). Specifically, increasing a pitch angle of blade 112 decreases a percentage of area 126 exposed to wind 124 and, conversely, decreasing a pitch angle of blade 112 increases a percentage of area 126 exposed to wind 124.

For example, a blade pitch angle of approximately 0 degrees (sometimes referred to as a "power position") exposes a significant percentage of a blade surface area 126 to wind 124, thereby resulting in inducement of a first value of lift forces on blade 112. Similarly, a blade pitch angle of approximately 90 degrees (sometimes referred to as a "feathered position") exposes a significantly lower percentage of blade surface area 126 to wind 124, thereby resulting in inducement of a second value of lift forces on blade 112. The first value of lift forces induced on blades 112 is greater than the second value of lift forces induced on blades 112 such that values of lift forces are directly proportional to blade surface area 126 exposed to wind 124. Therefore, values of lift forces induced on blades 112 are indirectly proportional to values of blade pitch angle.

Also, for example, as blade lift forces increase, a linear speed of blade tip portion 125 increases. Conversely, as blade lift forces decrease, the linear speed of blade tip portion 125 decreases. Therefore, values of the linear speed of blade tip portion 125 are directly proportional to values of the lift forces induced on blades 112 and it follows that the linear speed of blade tip portion 125 is indirectly proportional to the blade pitch angle.

Moreover, as the linear speed of blade tip portion 125 increases, an amplitude (not shown) of acoustic emissions (not shown in FIG. 1) from blade 112 increases. Conversely, as the linear speed of blade tip portion 125 decreases, the amplitude of acoustic emissions from blades 112 decreases. Therefore, the amplitude of acoustic emissions from blades 112 is directly proportional to the linear speed of blade tip portions 125 and, it follows that the amplitude of acoustic emissions from blades 112 is indirectly proportional to the blade pitch angle.

The pitch angles of blades 112 are adjusted about a pitch axis 118 for each blade 112. In the exemplary embodiment, the pitch angles of blades 112 are controlled individually. Alternatively, the pitch angles may be controlled as a group. Still further alternatively, the pitch of the blades, and the speed of the blades 112 may be modulated in order to reduce acoustic emissions. In one embodiment, wind turbine generator 100 may be controlled to reduce the potential acoustic emissions by a local controller (not shown), or remotely via a remote controller (not shown) to reduce noise.

Figure 2:
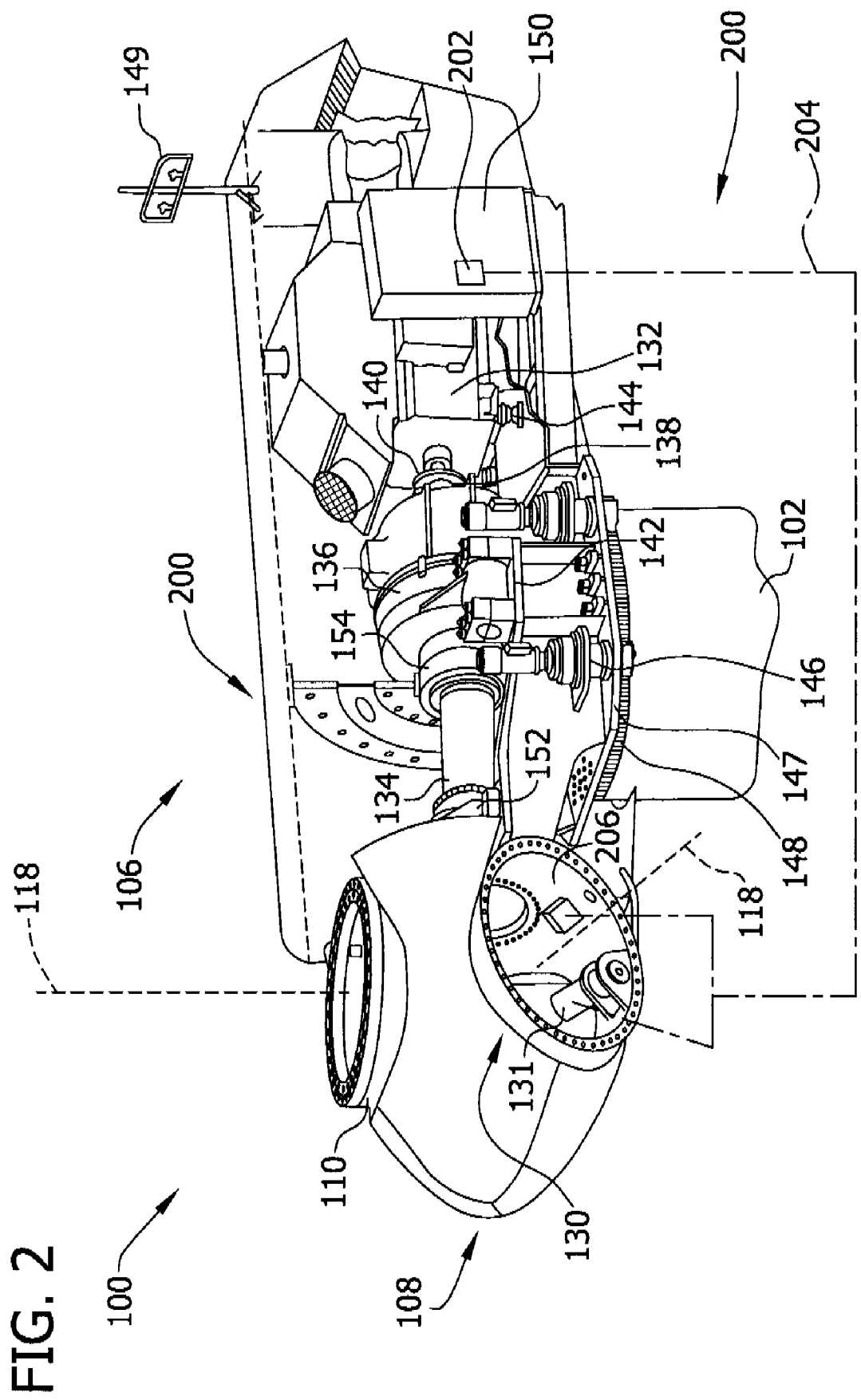
FIG. 2 is a cross-sectional schematic view of a nacelle used with the exemplary wind turbine generator shown in FIG. 1.

FIG. 2 is a cross-sectional schematic view of nacelle 106 of exemplary wind turbine generator 100. Various components of wind turbine generator 100 are housed in nacelle 106 atop tower 102 of wind turbine generator 100. Nacelle 106 includes one pitch drive mechanism 130 that is coupled to one blade 112 (shown in FIG. 1). Mechanism 130 modulates the pitch of associated blade 112 along pitch axis 118. Only one of three pitch drive mechanisms 130 is shown in FIG. 2. In the exemplary embodiment, each pitch drive mechanism 130 includes at least one pitch drive motor 131 Pitch drive motor 131 is any electric motor driven by electrical power that enables mechanism 130 to function as described herein. Alternatively, pitch drive mechanisms 130 include any suitable structure, configuration, arrangement, and/or components such as, but not limited to, hydraulic cylinders, springs, and servomechanisms. Moreover, pitch drive mechanisms 130 may be driven by any suitable means such as, but not limited to, hydraulic fluid, and/or mechanical power, such as, but not limited to, induced spring forces and/or electromagnetic forces.

Nacelle 106 also includes rotor 108 that is rotatably coupled to an electric generator 132 positioned within nacelle 106 via rotor shaft 134 (sometimes referred to as low speed shaft 134), a gearbox 136, a high speed shaft 138, and a coupling 140. Rotation of rotor shaft 134 rotatably drives gearbox 136 that subsequently rotatably drives high speed shaft 138. High speed shaft 138 rotatably drives generator 132 via coupling 140 and shaft 138 rotation facilitates generator 132 production of electrical power. Gearbox 136 and generator 132 are supported by supports 142 and 144, respectively. In the exemplary embodiment, gearbox 136 utilizes a dual path geometry to drive high speed shaft 138. Alternatively, main rotor shaft 134 is coupled directly to generator 132 via coupling 140.

Nacelle 106 further includes a yaw drive assembly 146 that is fixedly coupled to a lower bed plate 147 and that engages a tower ring gear 148 that may be used to rotate nacelle 106 and rotor 108 on axis 116 (shown in FIG. 1) to control the perspective of blades 112 with respect to the direction of the wind, as described in more detail herein. Nacelle 106 also includes at least one meteorological mast 149. Mast 149 includes a wind vane and anemometer (neither shown in FIG. 2). Mast 149 provides information to a turbine control system (not shown) that may include wind direction and/or wind speed. A portion of the turbine control system resides within a control panel 150. Nacelle 106 further includes forward and aft support bearings 152 and 154 that facilitate radial support and alignment of rotor shaft 134.

Wind turbine generator 100 includes a pitch control system 200. In one embodiment, at least a portion of pitch control system 200 is positioned in nacelle 106. Alternatively, at least a portion of pitch control system 200 is positioned outside nacelle 106. Specifically, at least a portion of pitch control system 200 described herein includes at least one processor 202 and a memory device (not shown), and at least one input/output (I/O) conduit 204, wherein conduit 204 includes at least one I/O channel (not shown). More specifically, processor 202 is positioned within control panel 150. Pitch control system 200 substantially provides a technical effect of wind turbine noise reduction as described herein.

As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but not be limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processor 202 and other processors (not shown) as described herein process information transmitted from a plurality of electrical and electronic devices that may include, but not be limited to, blade pitch position feedback devices 206 (described further below) and electric power generation feedback devices (not shown). RAM and storage devices (not shown) store and transfer information and instructions to be executed by processor 202. RAM and storage devices can also be used to store and provide temporary variables, static (i.e., non-changing) information and instructions, or other intermediate information to processor 202 during execution of instructions by processor 202. Instructions that are executed include, but are not limited to, resident blade pitch system 200 control commands. The execution of sequences of instructions is not limited to any specific combination of hardware circuitry and software instructions.

In the exemplary embodiment, at least a portion of pitch control system 200 including, but not limited to, processor 202 is positioned within control panel 150. Moreover, processor 202 is coupled to blade pitch drive motors 131 via at least one I/O conduit 204. I/O conduit 204 includes any number of channels having any architecture including, but not limited to, Cat 5/6 cable, twisted pair wiring, and wireless communication features. Pitch control system 200 may include distributed and/or centralized control architectures.

Pitch control system 200 also includes a plurality of independent blade pitch position feedback devices 206 coupled with processor 202 via at least one I/O conduit 204. In the exemplary embodiment, each pitch drive mechanism 130 is associated with a single blade pitch position feedback device 206. Alternatively, any number of blade pitch position feedback devices 206 are associated with each mechanism 130. Therefore, in the exemplary embodiment, pitch drive mechanism 130 and associated drive motor 131, as well as blade pitch position feedback device 206, are included in system 200 as described herein. Each blade pitch position feedback device 206 measures a pitch position of each blade 112, or more specifically an angle of each blade 112 with respect to wind 124 (shown in FIG. 1) and/or with respect to rotor hub 110. Blade pitch position feedback device 206 is any suitable sensor having any suitable location within or remote to wind turbine generator 100, such as, but not limited to, optical angle encoders, magnetic rotary encoders, and incremental encoders, or some combination thereof. Moreover, blade pitch position feedback device 206 transmits pitch measurement signals (not shown) that are substantially representative of associated blade 112 pitch position to processor 202 for processing thereof.

Figure 3:
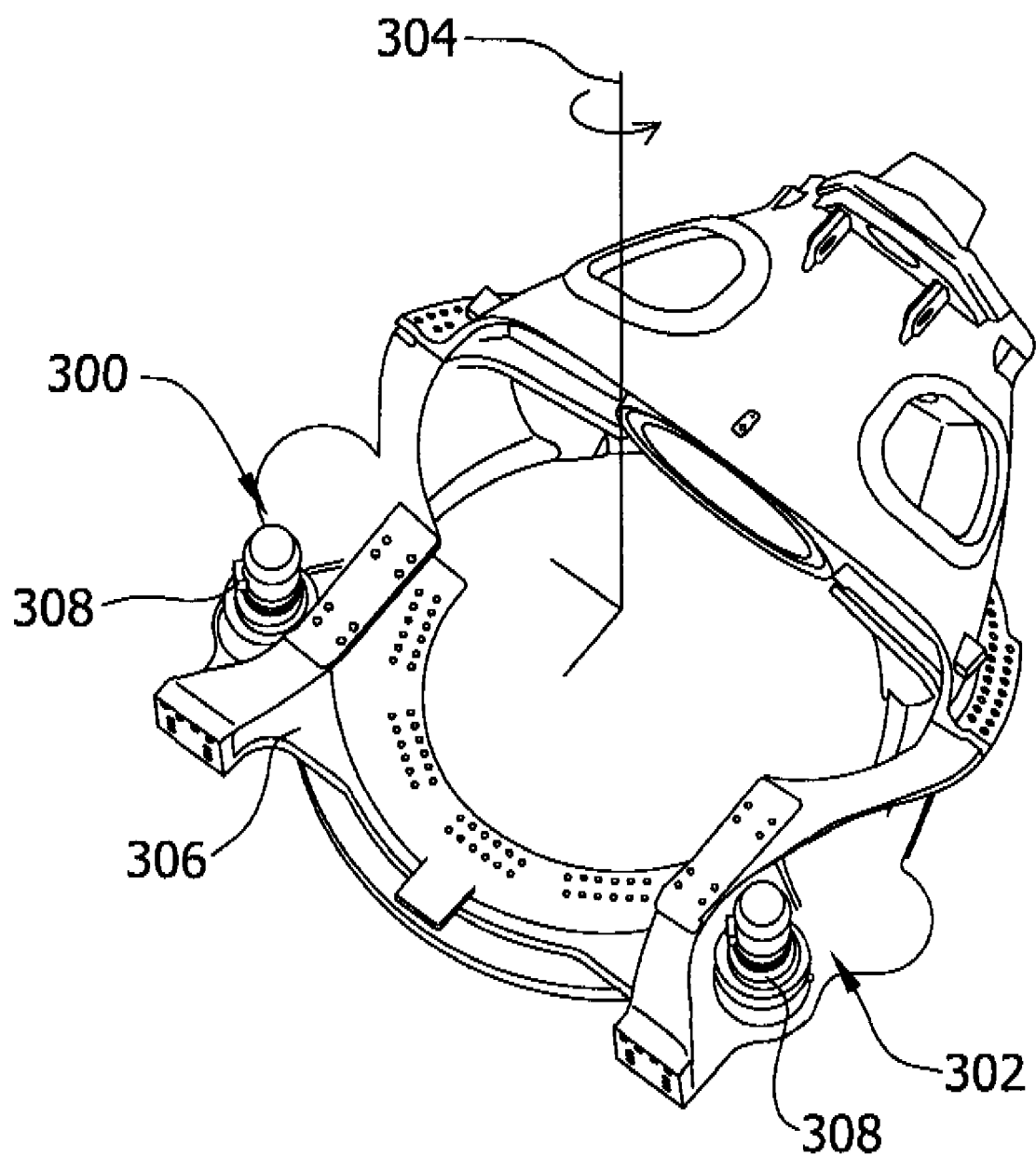
FIG. 3 is a perspective view of an exemplary yaw drive assembly used with the exemplary wind turbine generator shown in FIG. 1.

FIG. 3 is a perspective view of exemplary yaw drive assemblies 300 and 302 used with exemplary wind turbine generator 100 shown in FIG. 1. In the exemplary embodiment, wind turbine generator 100 includes two yaw drive assemblies 300 and 302 that are positioned substantially radially opposite each other about a yaw axis of rotation 304. Alternatively, any number of yaw drive assemblies may be included that enables wind turbine generator 100 to function as described herein. In one embodiment, a substantially similar drive assembly may be used to control pitch of rotor blades 112 (shown in FIG. 1) for wind turbine generator 100.

In the exemplary embodiment, yaw drive assemblies 300 and 302 are coupled to a lower bed plate 306 that is positioned atop wind turbine tower 102 (as shown in FIG. 2) such that yaw drive assemblies engage tower ring gear 148 (shown in FIG. 2) that is coupled to wind turbine tower 102, and such that wind turbine generator 100 may function as described herein. Yaw drive assemblies 300 and 302 include a transmission case 308 that substantially encloses each yaw drive assembly 300 and 302 and maintains internal gearing components therein.

Figure 4:
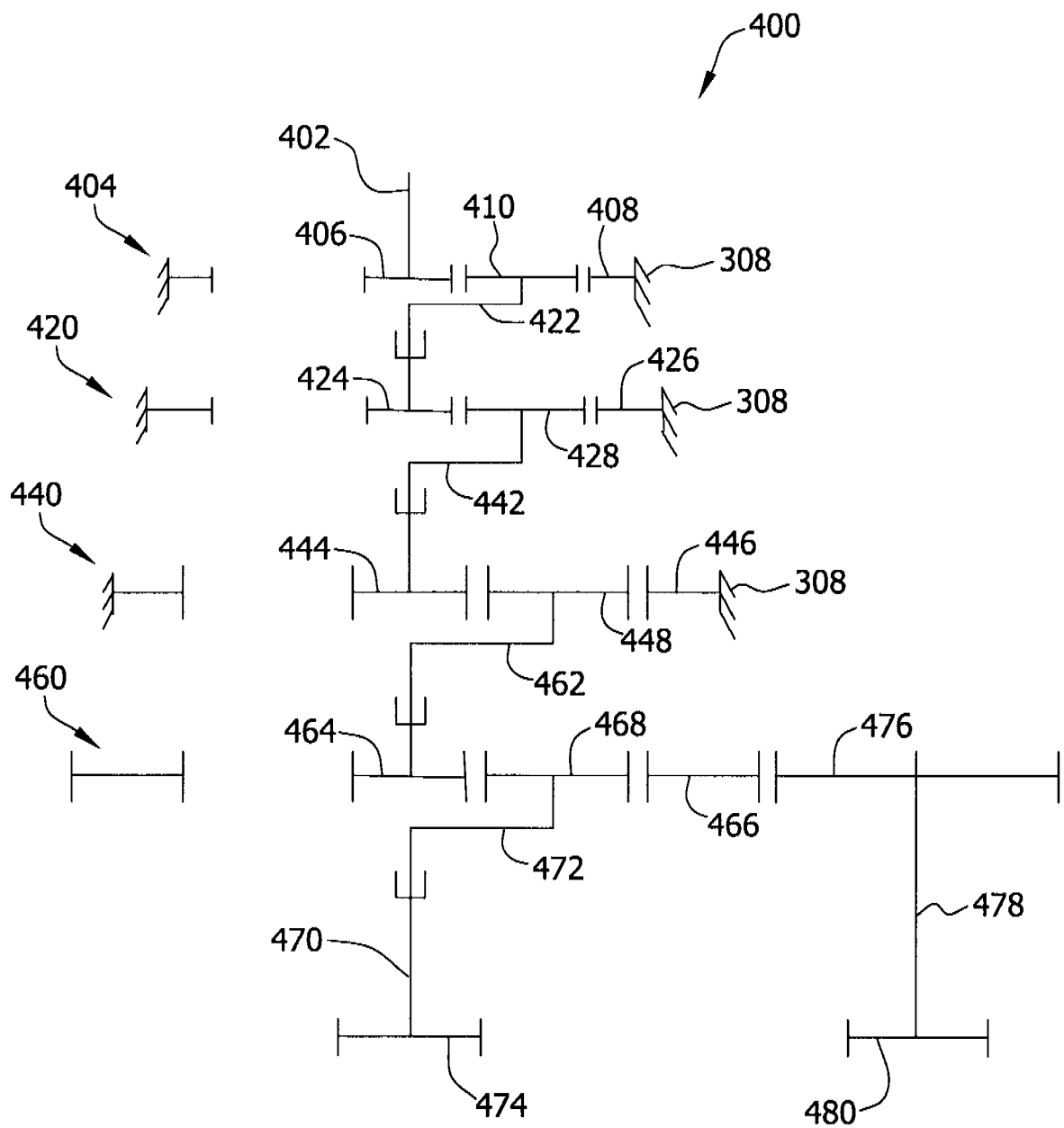
FIG. 4 is a schematic illustration of an exemplary gearing structure used with the exemplary yaw drive assembly shown in FIG. 3.

FIG. 4 is a schematic illustration of an exemplary gearing structure 400 used with exemplary yaw drive assemblies 300 and 302 shown in FIG. 3. In the exemplary embodiment, an input shaft 402 is rotatably supported within transmission case 308 and is operatively coupled to a first stage planetary assembly 404. First stage planetary assembly 404 includes an input sun gear 406 that receives a torque transmitted thereto by input shaft 402 and a ring gear 408 that is fixedly coupled within transmission case 308. In the exemplary embodiment, a planetary gear 410 is operatively coupled between sun gear 406 and ring gear 408. Alternatively, any number of planetary gears 410 may be used within first stage planetary assembly 404 to transmit the input torque from input shaft 402, such that yaw drive assemblies 300 and 302 may function as described herein.

In the exemplary embodiment, planetary gear 410 transmits the input torque to a second stage planetary assembly 420 via a force transmission rod 422. Second stage planetary assembly 420 includes an input sun gear 424 that receives a torque transmitted thereto via force transmission rod 422, and a ring gear 426 that is fixedly coupled within transmission case 308. In the exemplary embodiment, a planetary gear 428 is operatively coupled between sun gear 424 and ring gear 426. Alternatively, any number of planetary gears 428 may be used within second stage planetary assembly 420 to transmit the input torque from input shaft 402, such that yaw drive assemblies 300 and 302 may function as described herein.

In the exemplary embodiment, planetary gear 428 transmits the input torque to a third stage planetary assembly 440 via a force transmission rod 442. Third stage planetary assembly 440 includes an input sun gear 444 that receives a torque transmitted thereto via force transmission rod 442, and a ring gear 446 that is fixedly coupled within transmission case 308. In the exemplary embodiment, a planetary gear 448 is operatively coupled between sun gear 444 and ring gear 446. Alternatively, any number of planetary gears 448 may be used within third stage planetary assembly 440 to transmit the input torque from input shaft 402, such that yaw drive assemblies 300 and 302 may function as described herein.

In the exemplary embodiment, planetary gear 448 transmits the input torque to a fourth stage planetary assembly 460 via a force transmission rod 462. Fourth stage planetary assembly 460 includes an input sun gear 464 that receives a torque transmitted thereto via force transmission rod 462, and a differential gear 466. In the exemplary embodiment, a planetary gear 468 is operatively coupled between sun gear 464 and differential gear 466. Alternatively, any number of planetary gears 468 may be used within fourth stage planetary assembly 460 to transmit the input torque from input shaft 402, such that yaw drive assemblies 300 and 302 may function as described herein. Planetary gear 468 transmits the input torque to a first output shaft 470 via a force transmission rod 472. A first output pinion 474 is coupled to first output shaft 470 and engages tower ring gear 148 (shown in FIG. 2) to apply torque thereto for yawing wind turbine generator 100 about axis 116 (shown in FIG. 1).

Differential gear 466 engages an output gear 476. In the exemplary embodiment, output gear 476 is a spur gear that engages differential gear 466 and transmits the output torque to a second output shaft 478. Alternatively, output gear 476 may be any type of gear that enables yaw drive assemblies 300 and 302 to function as described herein, such as for example a helical gear. A second output pinion 480 is coupled to output shaft 478 and engages tower ring gear 148 (shown in FIG. 2) to apply torque thereto for yawing wind turbine generator 100 about axis 116 (shown in FIG. 1). In the exemplary embodiment, first and second output shafts 470 and 478 distribute the input rotational yaw force substantially equally along tower ring gear 148 to facilitate rotation of wind turbine generator 100 about axis 116.

Figure 5:
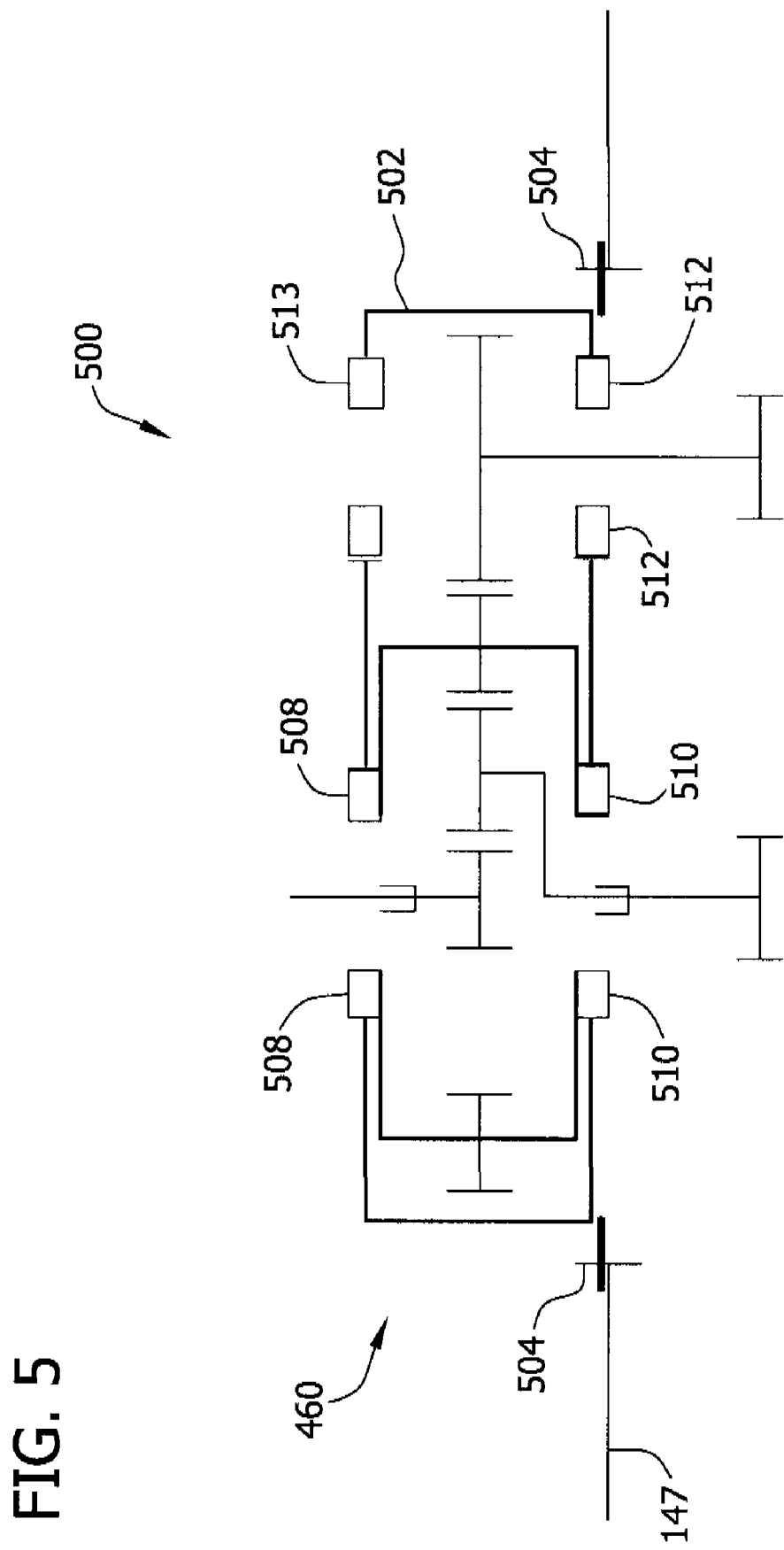
FIG. 5 is a schematic illustration of an exemplary differential stage used with the exemplary gearing structure shown in FIG. 4.

FIG. 5 is a schematic illustration of an exemplary differential stage 500 suitable for use with exemplary gearing structure 400 shown in FIG. 4. In the exemplary embodiment, fourth stage planetary assembly 460 is housed within a case 502 that is coupled to lower bed plate 147 via a plurality of bolts 504. Alternatively, case 502 may be coupled to lower bed plate 147 via any type of fastening device, or combination thereof, that enables yaw drive assemblies 300 and 302 to function as described herein, such as for example by a weld and/or a screw.

In the exemplary embodiment, differential gear 466 is supported within case 502 via a plurality of bearings 508 and 510, and gear 476 (shown in FIG. 4) is supported by bearings 512 and 513. Alternatively, gear 476 may be supported by only bearing 512. Input sun gear 464 is rotationally supported within case 502 and first and second output shafts 470 and 478 are rotationally supported within case 502 via a plurality of bearings.

During operation, yaw drive assemblies 300 and 302 utilize multiple output shafts, thereby reducing the number of yaw drive assemblies required per wind turbine generator 100. More specifically, the exemplary yaw drive assembly configuration described herein enables the use of two output pinions to facilitate supplying the torque typically produced by two separate yaw drives. Therefore, the number of yaw drive assemblies is reduced.

Figure 6:
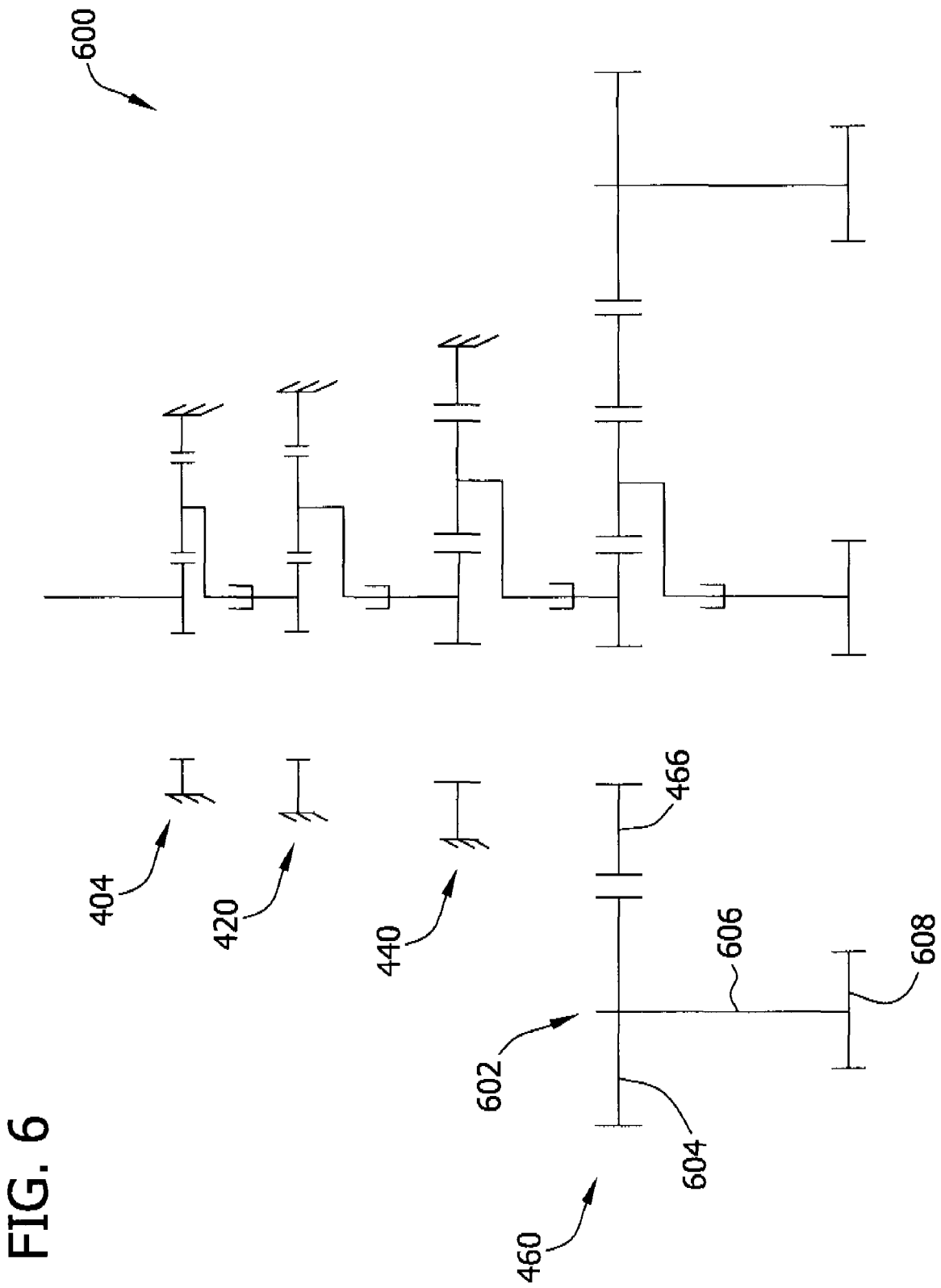
FIG. 6 is a schematic illustration of an alternative gearing structure that may be used with the exemplary yaw drive assembly shown in FIG. 3.

FIG. 6 is a schematic illustration of an alternative gearing structure 600 that may be used with the exemplary yaw drive assembly shown in FIG. 3. The operation of gearing structure 600 is similar to gearing structure 400 shown in FIG. 4 and described herein. Therefore, like components are similarly numbered therein. However, while gearing structure 600 is similar to the embodiment illustrated in FIG. 4, gearing structure 600 incorporates a third output gearing assembly 602 using an additional output spur gear 604 positioned within fourth planetary assembly 460. More specifically, third output gearing assembly 602 includes output gear 604 that engages differential gear 466. In the illustrated alternative embodiment, output gear 604 is a spur gear that engages differential gear 466 and transmits the output torque to a third output shaft 606. Alternatively, output gear 604 may be any type of gear that enables yaw drive assemblies 300 and 302 to function as described herein, such as for example a helical gear. A third output pinion 608 is coupled to output shaft 606 and engages tower ring gear 148 (shown in FIG. 2) to apply torque thereto for yawing and/or pitching wind turbine generator 100 (shown in FIG. 1). Alternatively, any number of output gear, shaft and pinion combinations may be used that enables wind turbine generator 100 to function as described herein. During operations, such an alternative gearing structure 600 will distribute the input rotational yaw force substantially equally along tower ring gear 148 to facilitate rotation of wind turbine generator 100 about axis 116.

Figure 7:
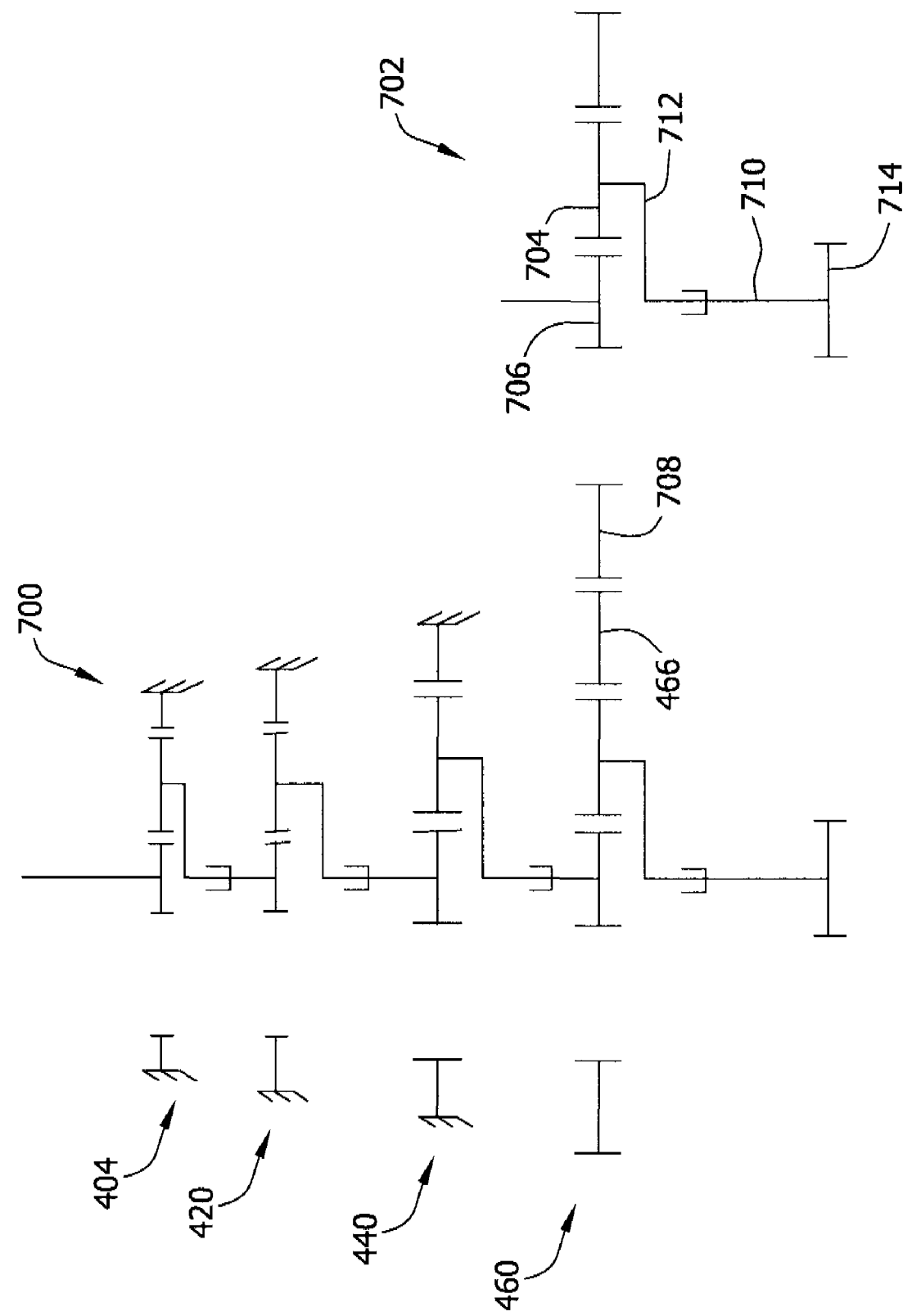
FIG. 7 is a schematic illustration of an alternative gearing structure that may be used with the exemplary yaw drive assembly shown in FIG. 3.

FIG. 7 is a schematic illustration of an alternative gearing structure 700 that may be used with the exemplary yaw drive assemblies 300 and 302 shown in FIG. 3. The operation of gearing structure 700 is similar to gearing structure 400 shown in FIG. 4 and described herein. Therefore, like components are similarly numbered therein. However, while gearing structure 700 is similar to the embodiment illustrated in FIG. 4, gearing structure 700 incorporates a second output planetary gearing assembly 702. More specifically, and in the illustrated alternative embodiment, fifth stage planetary assembly 702 includes a sun gear 706, a differential gear 708 that engages differential gear 466, and planetary gear 704 is operatively coupled between sun gear 706 and differential gear 708. Planetary gear 704 transmits the input torque to a second output shaft 710 via a force transmission rod 712. The second output pinion 714 is coupled to second output shaft 710 and engages tower ring gear 148 (shown in FIG. 2) to apply torque thereto for yawing wind turbine generator 100 about axis 116 (shown in FIG. 1). In an alternative embodiment, more than one planetary assembly 460 may be provided such that more than one output transmits torque to tower ring gear (shown in FIG. 2).

Exemplary embodiments of yaw drive assemblies are described in detail above. The above-described yaw drive assemblies utilize multiple output shaft assemblies to facilitate reducing the number of yaw drive assemblies per wind turbine. More specifically, the last stage of the yaw drive assembly may include a differential planetary gear that enables the use of two output pinions to facilitate supplying the torque produced by two separate yaw drives. Therefore, the number of yaw drive assemblies may be reduced by 50%, i.e. two yaw drive assemblies may be used instead of four yaw drive assemblies per wind turbine, and therefore a weight of the overall wind turbine yaw drive system is facilitated being reduced. This may result in a control system that can be optimized to a smaller size, and minimizes the number of working components, thereby simplifying manufacturing, assembly, and maintenance of the wind turbine generator.

Furthermore, such a system may reduce a backlash effect common in known wind turbines, and enables a more effective utilization of the control system by providing a yaw drive assembly that is easier to control with increased accuracy by improving damping against fluctuating wind loads. The fewer number of rotating components for the amount of torque transmitted may result in a system with an improved life of the yawing gear components.

Although the foregoing description contains many specifics, these should not be construed as limiting the scope of the present invention, but merely as providing illustrations of some of the embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

While the apparatus and methods described herein are described in the context of yaw drive assemblies for use with wind turbine systems, it is understood that the apparatus and methods are not limited to wind turbine applications but may include yaw and/or pitch drive assemblies utilized within any rotatable machine. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A yaw drive assembly for a rotatable system, said yaw drive assembly comprising:
    an input shaft configured to receive a torque from a yaw drive motor coupled within a body of said rotatable system, the torque facilitates rotating the rotatable system about a yaw axis;
    at least two output shafts configured to receive the torque and transmit a rotational yaw force to the rotatable system; and
    a differential gear stage operatively coupled to said output shafts, said differential gear stage comprising a differential planetary gear configured to drive a pinion coupled to each of said output shafts.

2. A yaw drive assembly in accordance with claim 1, wherein said output shafts comprise a spur gear configured to operatively engage said differential gear stage via said differential planetary gear.

3. A yaw drive assembly in accordance with claim 1, further comprising at least one planetary stage rotatably coupled between said input shaft and said output shafts, each said planetary stage comprising at least one planetary gear.

4. A yaw drive assembly in accordance with claim 3, wherein said planetary stage comprises at least three planetary stages operatively coupled between said input shaft and said differential planetary gear via respective planetary gears.

5. A yaw drive assembly in accordance with claim 3, wherein said yaw drive assembly further comprises a transmission case configured to substantially enclose said yaw drive assembly, and wherein said planetary stage further comprises a ring gear fixedly coupled to an interior of said transmission case.

6. A yaw drive assembly in accordance with claim 1, wherein said output shafts are operatively coupled in parallel via said differential gear stage, said output shafts configured to engage a ring gear coupled to an upper portion of the rotatable system via the respective pinion.

7. A yaw drive assembly in accordance with claim 6, wherein said output shafts are configured to distribute the rotational yaw force substantially equally along a surface of said ring gear.

8. A wind turbine comprising:
    a yaw drive motor;
    at least one yaw drive assembly operatively coupled to said yaw drive motor, said yaw drive assembly comprising:
        an input shaft configured to receive a torque from said yaw drive motor coupled within a body of said wind turbine, the torque facilitates rotating said wind turbine about a yaw axis;
        at least two output shafts configured to receive the torque and transmit a rotational yaw force to said wind turbine; and
        a differential gear stage operatively coupled to said output shafts, said differential gear stage comprising a differential planetary gear configured to drive a pinion coupled to each of said output shafts.

9. A wind turbine in accordance with claim 8, wherein said output shafts comprise a spur gear configured to operatively engage said differential gear stage via said differential planetary gear.

10. A wind turbine in accordance with claim 8, further comprising at least one planetary stage rotatably coupled between said input shaft and said output shafts, each said planetary stage comprising at least one planetary gear.

11. A wind turbine in accordance with claim 10, wherein said planetary stage comprises at least three planetary stages operatively coupled between said input shaft and said differential gear via respective planetary gears.

12. A wind turbine in accordance with claim 10, wherein said yaw drive assembly further comprises a transmission case configured to substantially enclose said yaw drive assembly, and wherein said planetary stage further comprises a ring gear fixedly coupled to an interior of said transmission case.

13. A wind turbine in accordance with claim 8, wherein said output shafts are operatively coupled in parallel via said differential gear stage, said output shafts configured to engage a ring gear coupled to an upper portion of said wind turbine via the respective pinion.

14. A wind turbine in accordance with claim 13, wherein said output shafts are configured to distribute the rotational yaw force substantially equally along a surface of said ring gear.

15. A method for assembling a rotatable system, said method comprising:
    coupling a yaw drive assembly to a yaw drive motor via an input shaft, the input shaft configured to receive a torque from a yaw drive motor coupled within a body of the rotatable system, the torque facilitates rotating the rotatable system about a yaw axis;
    extending at least two output shafts from the yaw drive assembly, the output shafts configured to transmit a rotational yaw force to the rotatable system; and
    operatively coupling a differential gear stage to the output shafts, the differential gear stage including a differential planetary gear configured to drive a pinion coupled to each of the output shafts.

16. A method in accordance with claim 15, wherein said method comprises providing a spur gear on each of the output shafts, the spur gear configured to operatively engage the differential gear stage via the differential planetary gear.

17. A method in accordance with claim 15, further comprising distributing the rotational yaw force substantially equally along a surface of a ring gear of the planetary stage.

18. A method in accordance with claim 17, further comprising rotatably coupling at least one planetary stage between the input shaft and the output shafts, the planetary stage including at least one planet gear.

19. A method in accordance with claim 17, further comprising:
  substantially enclosing the yaw drive assembly within a transmission case; and
  fixedly coupling the ring gear to an interior of the transmission case.

20. A method in accordance with claim 15, further comprising operatively coupling the output shafts in parallel via the differential gear stage, the output shafts configured to engage a ring gear coupled to an upper portion of the rotatable system via the respective pinion.

* * * * *